United States Patent [19]
Yewell

[11] Patent Number: 6,032,732
[45] Date of Patent: Mar. 7, 2000

[54] WELL HEAD HEATING SYSTEM

[76] Inventor: Ronald E. Yewell, Box #9 Site #7 Rocky Mountain House, Alberta, Canada, T0M1T0

[21] Appl. No.: 09/067,476

[22] Filed: Apr. 27, 1998

[51] Int. Cl.[7] .................................................. E21B 36/00
[52] U.S. Cl. ........................... 166/57; 166/901; 166/302
[58] Field of Search ................... 165/51, 299; 236/99 R; 166/57, 61, 62, 901, 302

[56] References Cited

U.S. PATENT DOCUMENTS

| | | | |
|---|---|---|---|
| 2,532,995 | 12/1950 | Chausse | 165/51 |
| 2,925,986 | 2/1960 | Woods | 236/99 R |
| 4,251,029 | 2/1981 | Carson | 237/12.1 |
| 5,098,036 | 3/1992 | Brigham et al. | 244/134 R |
| 5,656,136 | 8/1997 | Gayaut et al. | 166/302 |

*Primary Examiner*—William Neuder
*Assistant Examiner*—John Kreck

[57] ABSTRACT

The present invention relates to a system for heating the well head assembly of a conventional oil well pumper. The system functions by routing a portion of the engine coolant from the pumper engine to a heat tracing loop. This loop enables a portion of the coolant to heat a well head assembly. Such heating reduces well head freeze ups and consequent well shut downs. The present invention also employs a temperature regulator which functions in optimizing the amount of engine coolant routed into the heat tracing loop. An amount of vaporizable fluid is in thermal contact with the heat tracing loop. Increased tempertures within the loop serve to vaporize the fluid. This vaporized fluid is then employed within an expansible bellows. Expansion of the bellows serves to open a poppet valve and decrease the amount of coolant routed through the loop.

5 Claims, 2 Drawing Sheets

WELL HEAD HEATING SYSTEM

BACKGROUND OF THE INVENTION

1. Field of the Invention

The present invention relates to a well head heating system and more particularly pertains to such a system for use in conjunction with a pump well.

2. Description of the Prior Art

The use of heat exchangers is known in the prior art. More specifically, heat exchangers are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,862,951 to Muller discloses an apparatus for heating windshield washer fluid. U.S. Pat. No. 5,099,909 to Barigelli discloses a surface type heat exchanger for heating washer fluid. U.S. Pat. No. 5,183,099 to Bechu discloses a motor vehicle windshield washer system. U.S. Pat. No. 4,895,203 to McLaren discloses a heat exchanger with a helically coiled conduct. U.S. Pat. No. 4,575,003 to Linker discloses a fluid heating attachment for automobile engine cooling systems. Lastly, U.S. Design Pat. No. 335,338 to Shero discloses the design for a heat exchanger housing.

In this respect, the heating system of the present invention substantially departs from the conventional concepts and designs of the prior art, and in so doing provides an apparatus primarily developed for the purpose of heating a well head assembly.

Therefore, it can be appreciated that there exists a continuing need for improved heat exchangers. In this regard, the present invention substantially fulfills this need.

SUMMARY OF THE INVENTION

In view of the foregoing disadvantages inherent in the known types of heat exchangers now present in the prior art, the present invention provides a heating system for use in conjunction with a well head assembly. As such, the general purpose of the present invention, which will be described subsequently in greater detail, is to prevent freezing of well head assemblies.

To attain this, the present invention essentially comprises a system for heating the well head assembly of a conventional oil well pumper. The system functions by routing a portion of the engine coolant from the pumper engine to a heat tracing loop. This loop enables a portion of the coolant to heat the well head assembly. This heating reduces well head freeze ups and consequent well shut downs. The present invention also employs a temperature regulator which functions in optimizing the amount of engine coolant routed into the heat tracing loop. An amount of vaporizable fluid is in thermal contact with down stream side of the heat tracing loop. Increased temperatures within the loop serve to vaporize the fluid. This vaporized fluid is then employed within an expansible bellows. Expansion of the bellows serves to open a poppet valve and decrease the amount of coolant routed through the loop.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved well head heating assembly.

It is another object of the present invention to provide a pump well wherein freezing of the head assembly is prevented.

It is a further object of the present invention to provide a system utilizing the engine coolant in a productive and efficient manner.

An even further object of the present invention is to provide a heating system which is susceptible of a low cost of manufacture with regard to both materials and labor, and which accordingly is then susceptible of low prices of sale to the consuming public, thereby making such heating system economically available to the buying public.

Still yet another object of the present invention is to provide a heating system which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

The present invention relates to a system for removing heat away from the pumper well head assembly of a conventional oil well pumper. The system functions by routing a portion of the engine coolant from the pumper engine to a heat tracing loop. This loop enables a portion of the coolant to heat the pumper well head assembly. This reduces well head freeze ups and consequent well shut downs. The present invention also employs a temperature regulator which functions in changing the amount of engine coolant routed into the heat tracing loop. An amount of vaporizable fluid is in thermal contact with the heat tracing loop. Increased temperatures within the loop serve to vaporize the fluid. This vaporized fluid is then employed within an expansible bellows. Expansion of the bellows serves to open a poppet valve and decrease the amount of coolant routed through the loop. The various components of the present invention, and the manner in which they interrelate, will be described in greater detail hereinafter.

Figure 3:
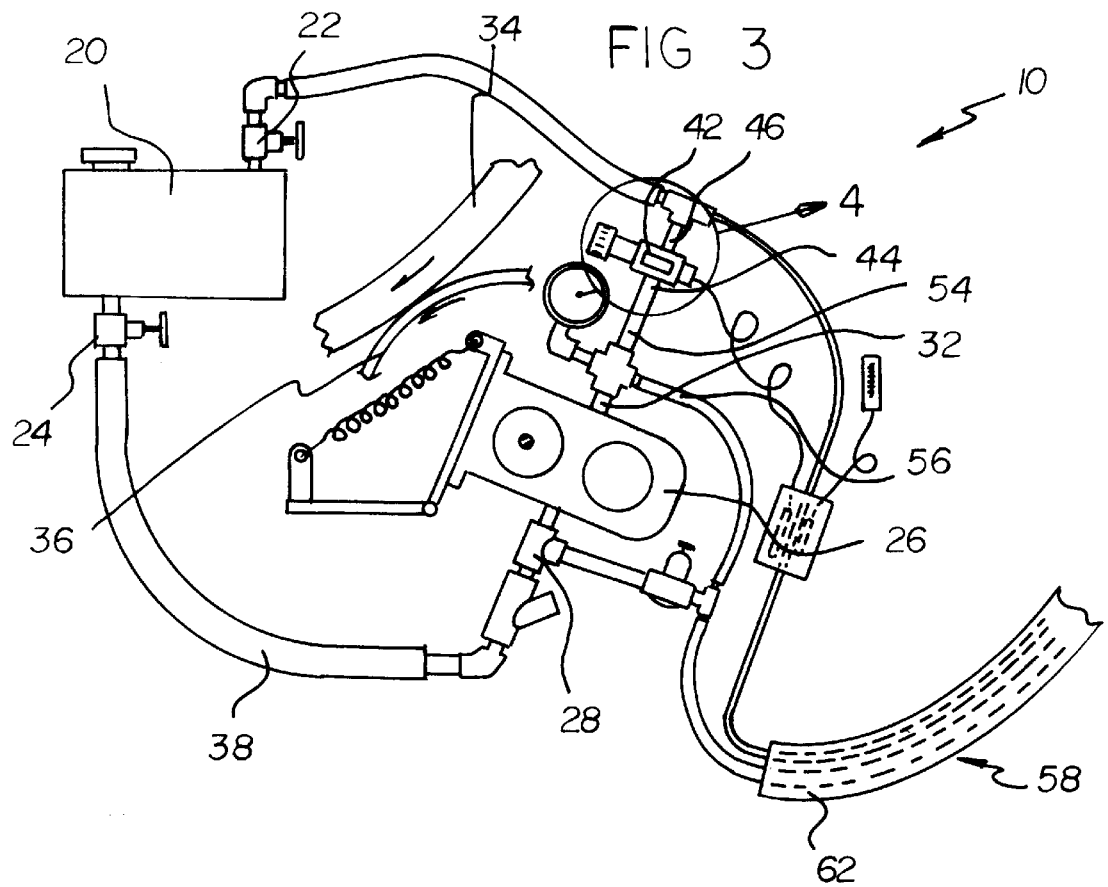
FIG. 3 is a schematic view of the system of the present invention.

With reference to FIG. 3, the engine water jacket 20 which is employed in the system 10 is depicted. This engine water jacket 20 houses engine coolant such as antifreeze, as such the jacket 20 includes an antifreeze inlet 22 and an antifreeze outlet 24. With continuing reference to FIG. 3, the gear pump 26 of the present invention is depicted. This gear pump 26 is defined by an inlet 28 and an outlet 32. An engine fly wheel 34, which is rotated by an associated engine is employed in powering the pump 26. More specifically, a friction drive wheel 36 in facing relation to the engine fly wheel 34. The friction drive wheel can be a rubber faced wheel or a wheel faced with another high friction material to provide a high friction contact with the rotating steel flywheel. In this manner the rotational energy from the engine is transferred to the gear pump 26. A length of tubing 38 serves to interconnect the engine water jacket outlet 24 and the gear pump inlet 28. The gear pump design is only possibility, however, in the choice of pumps. Another possibility is a Lobe pump.

Figure 4:
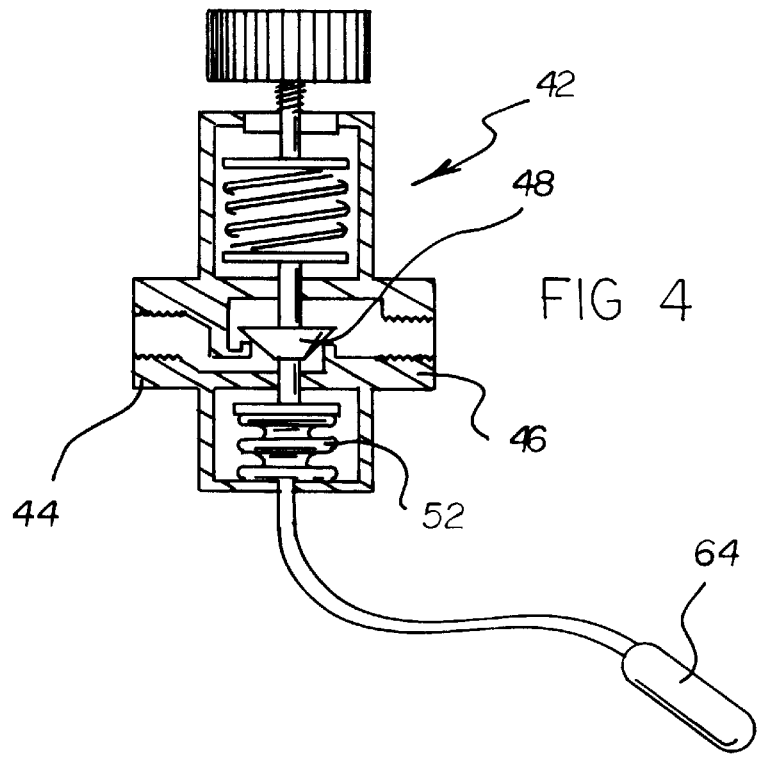
FIG. 4 is a detailed view taken from FIG. 3.

The temperature regulator 42 of the system is defined by an inlet 44 and an outlet 46. The regulator 42 further includes a spring biased poppet valve 48. This valve 48 has both a closed orientation and an opened orientation. The spring tends to bias the check valve 48 to a closed orientation. Additionally, a fluid filled bellows 52 is included within the temperature regulator 42, note FIG. 4. This fluid filled bellows 52 functions to urge the poppet valve 48 to an opened orientation when the fluid within the bellows 52 is vaporized. The manner by which the fluid is vaporized will be described in greater detail hereinafter. A length of tubing 54 serves to interconnect the gear pump outlet 32 and the temperature regulator inlet 44. Additionally, a bypass passage 56 is located along the length of the tubing 54. This bypass passages 56 functions in routing a portion of the engine coolant into the heat tracing loop 58 in a manner more fully described hereinafter.

Figure 1:
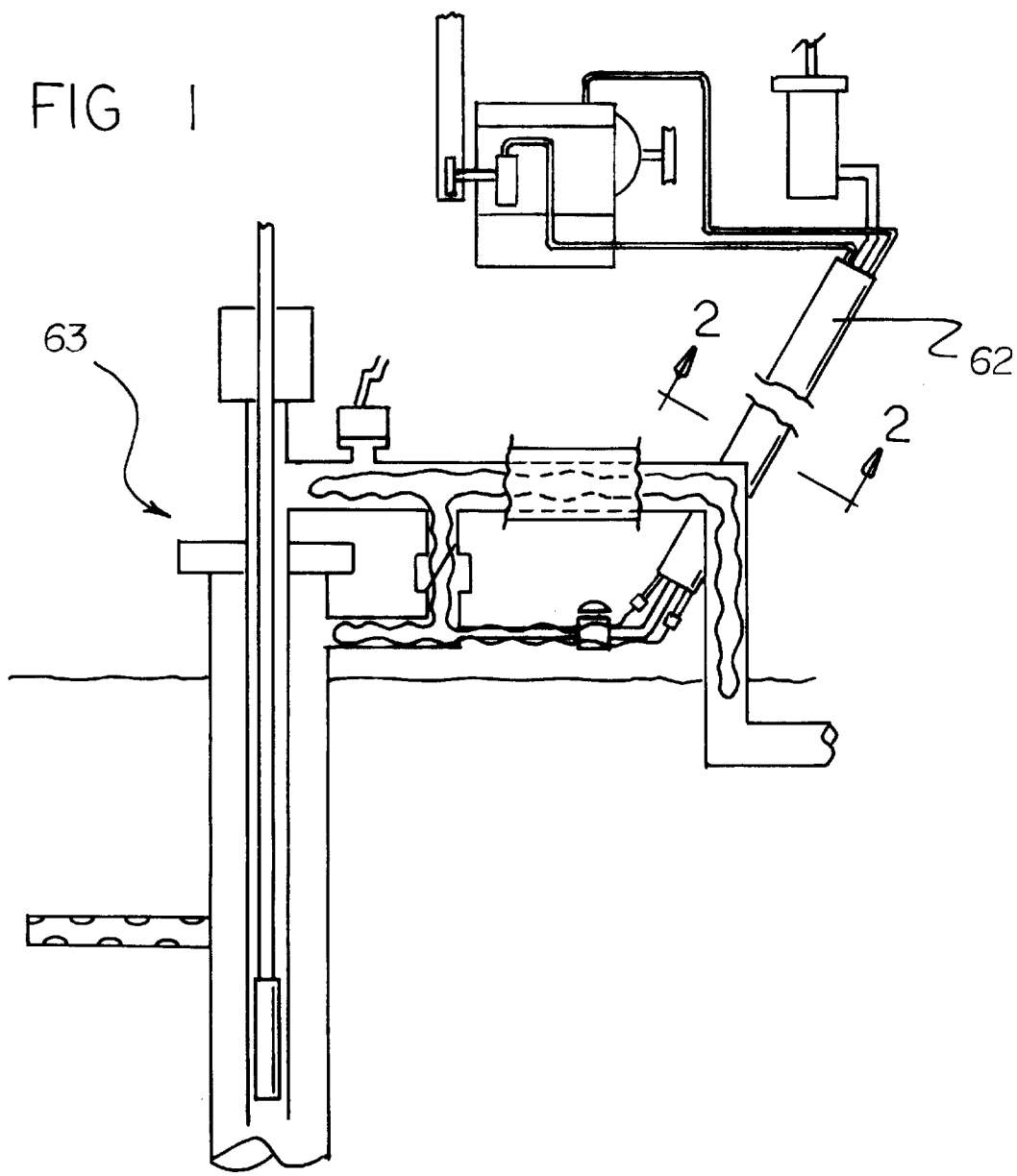
FIG. 1 is a schematic view of the heat tracing loop.
Figure 2:
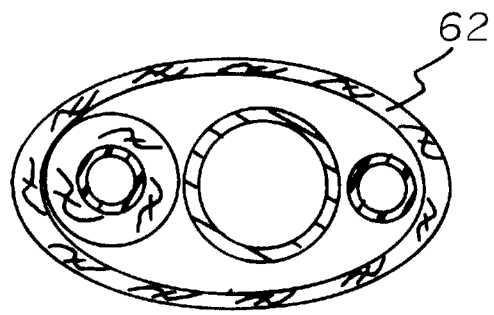
FIG. 2 is a cross section taken along line 2—2 of FIG. 1.

The heat tracing loop 58 of the present invention is defined by a first end which is interconnected to the bypass passage 56, and a second end which is interconnected to the outlet of the temperature regulator 46. The entire length of the heat tracing loop is covered by a P.V.C. jacketed insulation 62. In the preferred embodiment the jacket 62 is constructed from polyvinylchloride (P.V.C.). Such P.V.C. prevents normal insulating materials (eg Fiber-glass) from becoming normal wet and losing heat insulating properties. The jacketed insulation 62 is thus adapted to contain both the coolant supply and return tubing. The insulation jacket can also be employed to contain an engine fuel gas pipe, note FIG. 2. With reference to FIG. 1, the heat tracing loop 58 is in thermal contact with the pumper well head assembly 63. In this manner, the heat from the engine coolant can be transferred to the well head assembly 63. This transfer of heat prevents freezing condition at the well head 63.

The temperature regulator 42 works in conjunction with a bulb 64 of vaporizable fluid. The bulb 64 of fluid, in turn, is in thermal contact with the heat tracing loop 58. More specifically, the supply of vaporizable fluid is in fluid communication with the fluid filled bellows 52 such that vaporization the fluid within the bulb 64 results in the vaporization of the fluid within the bellows 52 and consequently the opening of the check valve 48.

Thus, in operation the heated coolant is routed from the water jacket and into the gear pump. From the gear pump the majority of the heated coolant is routed through the temperature regulator and back into the water jacket. However, a portion of heated coolant is routed into the heat tracing loop. This loop is brought into thermal contact with the pumper well head assembly, wherein the heat from the coolant is transferred to the well head assembly. The cooler coolant is then routed back toward the temperature regulator outlet. The bulb is employed in sensing the temperature of the cooled coolant. If the coolant is above a predetermined temperature the fluid within the bulb will vaporize causing the bellows of the temperature regulator to expand and open the regulator's valve. The opened valve results in less coolant being routed into the tracing loop. In this manner the valve position is eventually stabilized at some degree of opening for optimal heating of the well head assembly. The insulation functions as follows. The coolant side supply tubing is insulated along its full length to the well-head to prevent it from transferring heat energy to the cooler return tubing which would result in temperature regulation responding to a false well-head return coolant temperature. Both the supply and return tubings along with the engine fuel gas pipe are then insulated again so that the return coolant can provide heat to the fuel gas line. The system is designed like this for simplicity and neatness.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for transferring heat to from a pumper well head assembly to thereby reduce freezing conditions, the system comprising in combination:

an engine water jacket having an antifreeze inlet and an antifreeze outlet;

a gear pump having an inlet and an outlet, a engine fly wheel being rotated by an engine, a friction drive wheel in facing relation to the engine fly wheel for use in transferring rotational energy from the engine to the gear pump, a length of tubing interconnecting the engine water jacket outlet and the gear pump inlet;

a temperature regulator having an inlet and an outlet, the regulator further including a spring biased poppet valve having both a closed orientation and an opened orientation, the spring tending to bias the poppet valve to a closed orientation, a fluid filled bellows functioning to urge the poppet valve to an opened orientation when the fluid within the bellows is vaporized, a length of tubing interconnecting the gear pump outlet and the temperature regulator inlet, a bypass passage located along the length of the tubing;

a heat tracing loop having a first end interconnected to the bypass passage, and a second end interconnected to the outlet of the temperature regulator, the entire length of the heat tracing loop being insulated by a polyvinylchloride jacketed insulation, the heat tracing loop being in thermal contact with the pumper well head assembly;

a bulb of vaporizable fluid being in thermal contact with the heat tracing loop, the supply of vaporizable fluid fluid being in fluid communication with the fluid filled bellows such that vaporizing the fluid within the bulb results in the vaoporization of the fluid within the bellows and consequently the opening of the poppet valve.

2. A system for transferring heat to from a pumper well head assembly to thereby reduce freezing conditions, the system comprising in combination:

an engine water jacket having an antifreeze inlet and an antifreeze outlet;

a pump having an inlet and an outlet, a length of tubing interconnecting the engine water jacket outlet and the pump inlet;

a temperature regulator having an inlet and an outlet, the regulator further including a spring biased poppet valve having both a closed orientation and an opened orientation, the spring tending to bias the poppet valve to a closed orientation, a fluid filled bellows functioning to urge the poppet valve to an opened orientation when the fluid within the bellows is vaporized, a length of tubing interconnecting the pump outlet and the temperature regulator inlet, a bypass passage located along the length of the tubing;

a heat tracing loop having a first end interconnected to the bypass passage, and a second end interconnected to the outlet of the temperature regulator, the heat tracing loop being in thermal contact with the pumper well head assembly;

a bulb of vaporizable fluid being in thermal contact with the heat tracing loop, the supply of vaporizable fluid fluid being in fluid communication with the fluid filled bellows such that vaporizing the fluid within the bulb results in the vaoporization of the fluid within the bellows and consequently the opening of the poppet valve.

3. The system as described in claim 2 further comprising:

a engine fly wheel being rotated by an engine, a friction drive wheel in facing relation to the engine fly wheel for use in transferring rotational energy from the engine to the pump.

4. The system as described in claim 2 wherein:

the entire length of the heat tracing loop is insulated by a polyvinylchloride jacketed insulation.

5. The system as described in claim 2 wherein:

the pump is a gear pump.

\* \* \* \* \*